(12) United States Patent
Harvey

(10) Patent No.: US 6,208,507 B1
(45) Date of Patent: Mar. 27, 2001

(54) CARRYING CASE HAVING PLUG-IN CONNECTOR AND SWITCH MODULES FOR A COMPACT PORTABLE COMPUTER WORKSTATION

(76) Inventor: Stephen Harvey, 3851 Snow Rd., Las Cruces, NM (US) 88005

( * ) Notice: Subject to any disclaimer, the term of this patent is extended or adjusted under 35 U.S.C. 154(b) by 0 days.

(21) Appl. No.: 09/414,585

(22) Filed: Oct. 8, 1999

(51) Int. Cl.[7] ............... G06F 1/16; A45C 5/12; A45C 5/14; B65D 85/38
(52) U.S. Cl. ............ 361/683; 206/576; 206/320; 206/305
(58) Field of Search ................... 206/305, 576, 206/320; 312/223.1, 223.2, 223.3; 361/625, 683, 686, 685

(56) References Cited

U.S. PATENT DOCUMENTS

| | | | |
|---|---|---|---|
| 4,837,590 | * | 6/1989 | Sprague ................ 206/320 |
| 5,004,105 | * | 4/1991 | Freadman ............... 206/576 |
| 5,163,560 | * | 11/1992 | Parrish, Jr. et al. ...... 206/576 |
| 5,212,628 | * | 5/1993 | Bradbury ............... 361/395 |
| 5,214,574 | * | 5/1993 | Chang .................. 206/576 |
| 5,226,540 | * | 7/1993 | Bradbury ............... 206/576 |
| 5,242,056 | * | 9/1993 | Zia et al. .............. 206/576 |
| 5,437,367 | * | 8/1995 | Martin ................. 206/320 |
| 5,485,922 | * | 1/1996 | Butcher ................ 206/576 |
| 5,528,453 | * | 6/1996 | Berman et al. .......... 361/625 |
| 5,590,022 | * | 12/1996 | Harvey ................. 361/683 |
| 5,647,484 | * | 7/1997 | Fleming ................ 206/576 |
| 5,808,865 | * | 9/1998 | Alves .................. 361/685 |
| 5,857,568 | * | 1/1999 | Speirs ................. 206/320 |
| 6,131,734 | * | 10/2000 | Hollingsworth et al. ... 206/320 |
| 6,134,105 | * | 10/2000 | Lucker ................. 361/683 |

* cited by examiner

Primary Examiner—Leo P. Picard
Assistant Examiner—Lisa Lea-Edmonds
(74) Attorney, Agent, or Firm—Morland C. Fischer

(57) ABSTRACT

A carrying case having a body in which to transport a workstation including a personal computer, computer peripherals (e.g. a printer), and a source of battery power. Located within and extending along one side of the body of the carrying case is a shroud having a cover that is spaced above the body. Pockets are formed through the cover at opposite ends of the shroud. A switch module having a series of manually operable function switches is removably received within one of the pockets at one end of the shroud. A connector module is removably received within the other pocket at the opposite end of the shroud and adapted to interconnect an available power source, the personal computer, and the computer peripherals within the body of the carrying case without having to disturb either of the computer or the peripherals. The function switches of the switch module are selectively operated so that appropriate power and control signals are supplied to the computer and peripherals via the connector module.

10 Claims, 5 Drawing Sheets

CARRYING CASE HAVING PLUG-IN CONNECTOR AND SWITCH MODULES FOR A COMPACT PORTABLE COMPUTER WORKSTATION

BACKGROUND OF THE INVENTION

1. Field of the Invention

This invention relates to a carrying case that is adapted to safely transport a portable computer workstation. The carrying case has a plug-in switch module and a plug-in connector module that are removably attached to and readily available at the top of a shroud that lies along one side of the carrying case, whereby power distribution and control signals can be selectively routed between a power supply, the computer and computer peripherals of the workstation.

2. Background Art

Portable offices have been known for several years. In general, a personal computer, printer, power supply and other computer peripherals are packaged within a carrying case to facilitate transport and storage of a workstation. Many commercially available computer workstations are modular in nature such that different hardware components can be interconnected with one another and then added or replaced on an as-needed basis.

In some cases, the versatility of the computer workstation has been limited primarily due to the space limitations that are characteristic of the carrying case. That is to say, it is often desirable to package together many hardware components within the same carrying case. Consequently, the user is often subjected to inconvenience and a waste of time by having to remove the computer, printer and/or some of the other peripherals before he has sufficient room to be able to connect or disconnect the hardware components. What is even more, the cable runs which stretch between the computer, peripherals and power source in conventional carrying cases are known to be bulky and consume a relatively large volume of space so as to undesirably limit the usable volume of the case in which to package the hardware.

Therefore, it would be desirable to be able to efficiently arrange a modular, portable computer workstation within a carrying case where the cable runs and the connections between the computer, peripherals and power source are located at an out-of-the-way area within the case so as to advantageously conserve usable space and thereby allow an efficient packaging of the hardware and ready access to the connectors therebetween for the purpose of easily adding or removing the modular components, whereby to increase the life of the workstation and permit a wider range of computers and peripherals to be integrated within the carrying case.

Reference may be made to commonly owned U.S. Pat. Nos. 5,212,628 (issued May 18, 1993), 5,226,540 (issued Jul. 13, 1993) and 5,442,512 (issued Aug. 15, 1995) for examples of portable computer workstations within a carrying case.

SUMMARY OF THE INVENTION

In general terms, a carrying case for a modular, portable computer workstation having a plug-in switch module and a plug-in connector module is disclosed. The carrying case allows the workstation to be transported within an impact resistant, air and water tight body having a lid that is pivotally connected to and rotatable between opened and closed case positions relative to the body. Located within the body of the carrying case are a personal (e.g. notebook) computer, printer and other peripherals, such as, for example, a cellular phone, satellite phone, modem, scanner, digital camera and internal battery power supply.

Extending preferably along one side of the body of the carrying case is a shroud. The shroud has a top or cover plate which, in the assembled workstation relationship, is spaced above the body of the carrying case. Accordingly, electrical components and cables relating to power, temperature, voltage, and the like, can be efficiently located in the space below the cover plate so as to be surrounded by the shroud. By virtue of the foregoing, such electrical components do not interfere with the usable space in the body of the carrying case whereby the computer and computer peripherals may be efficiently packaged.

A first pocket is formed through one end of the cover plate at the top of the shroud, and a second pocket is formed through the opposite end of the cover plate. The plug-in switch module having a series of function switches is removably received within the first pocket of the shroud. With the lid of the carrying case rotated to the open case position, one or more of the function switches can be manually manipulated to control the distribution of power and control signals to the computer and computer peripherals. A multi-pin connector is mounted at the bottom of the switch module. When the switch module is received by the first pocket in the shroud, the multi-pin connector at the bottom of the connector module is automatically mated to a complementary connector that is affixed to the bottom of the pocket.

The plug-in connector module is removably received within the second pocket through the cover plate of the shroud. A series of connectors are mounted on the top of the connector module and positioned above the cover plate of the shroud so as to be easily interconnected with the computer and the computer peripherals. A multi-pin connector is mounted at the bottom of the connector module. When the connector module is received by the second pocket in the shroud, the multi-pin connector at the bottom of the connector module is automatically mated to a complementary connector that is affixed to the bottom of the pocket. By coupling together the connectors that are affixed at the bottoms of the first and second pockets of the shroud and by selectively operating the function switches of the switch module, power and control signals are routed to the computer and peripherals by way of the connectors of the connector module.

The plug-in switch and connector modules may be quickly and easily removed from the carrying case and replaced with a new or different module so that a variety of computer peripherals can be powered and controlled at the shroud depending upon the needs of the user without having to make mechanical changes to the workstation. What is more, the cable runs between the computer, peripherals and battery power source may be quickly disconnected from one another above the shroud without having to first empty the body of the carrying case or manipulate the workstation therewithin.

DETAILED DESCRIPTION

Figure 1:
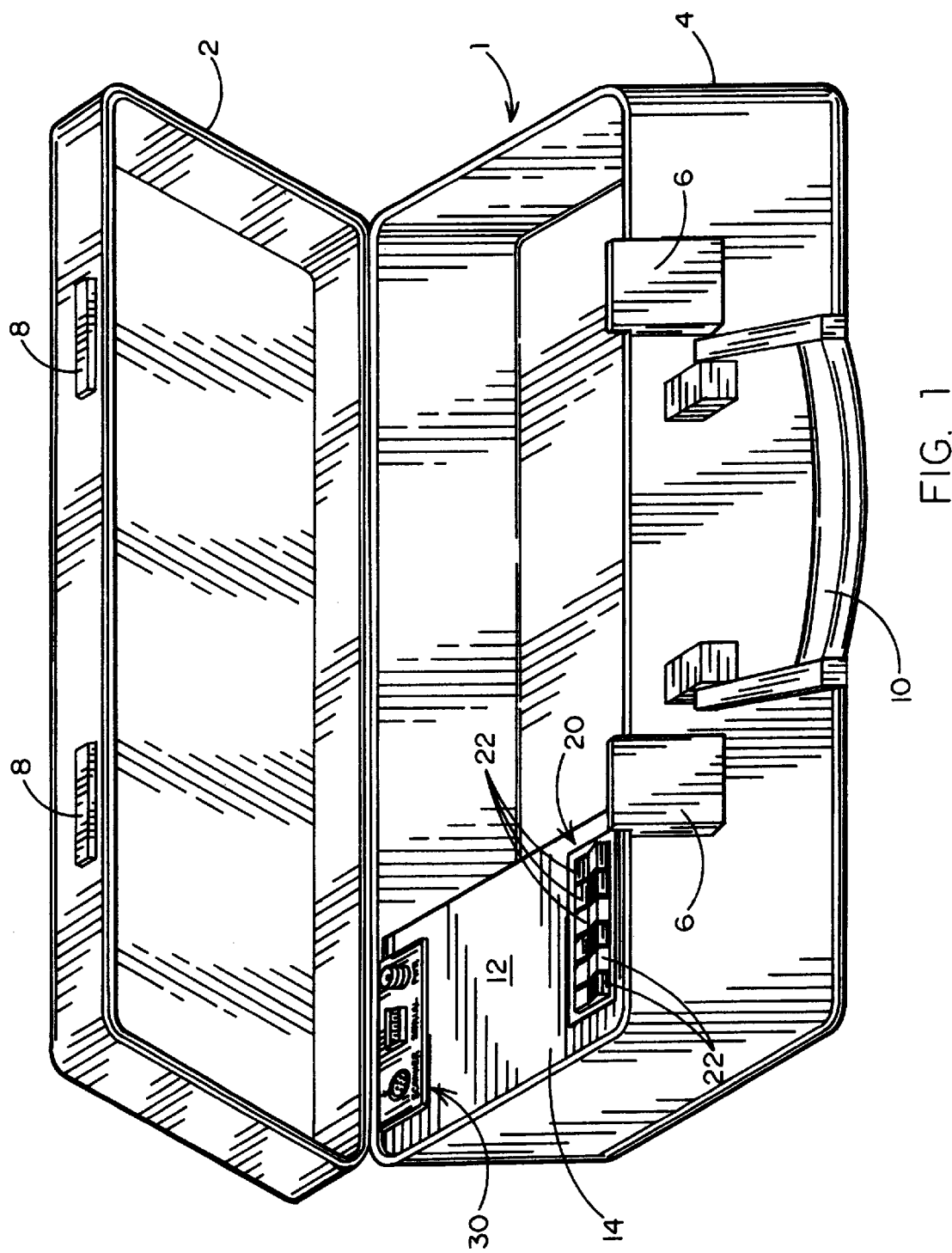
FIG. 1 is a front perspective view of a carrying case for a modular computer workstation having a shroud extending along one side of the case.
Figure 2:
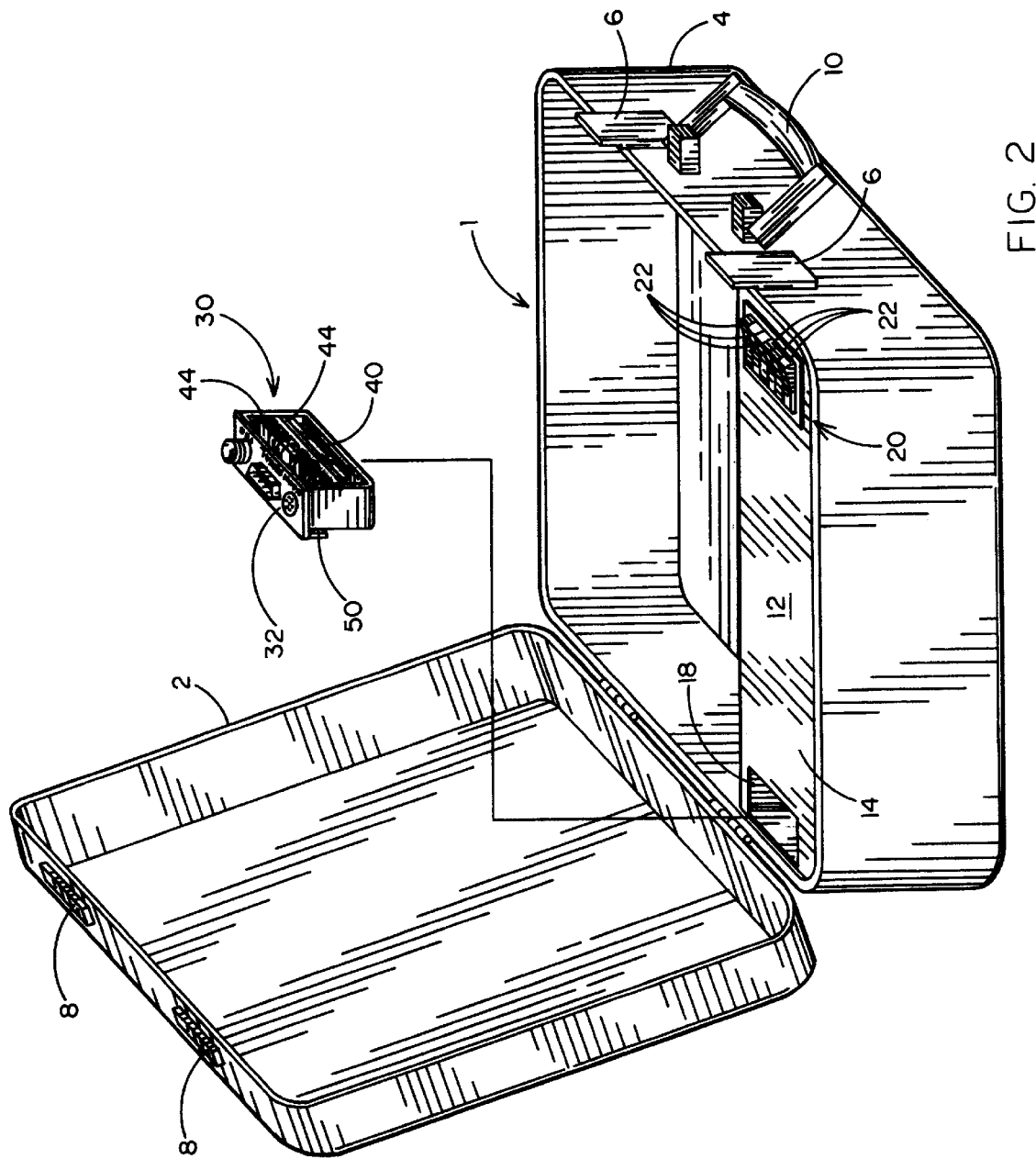
FIG. 2 is a side perspective view of the carrying case of FIG. 1 showing a plug-in connector module and a plug-in switch module to be removably received within respective pockets formed through a cover plate of the shroud.

The carrying case having a plug-in connector module and a plug-in switch module which forms the present invention is now described while referring to the drawings. FIGS. 1 and 2 illustrate the carrying case 1 in which a computer, printer, battery power supply and other peripherals (not shown) can be easily and safety transported. Although the carrying case 1 is shown empty, this is for the convenience of illustration only, and it is to be understood that carrying case 1 will be filled with a commercially available personal computer, printer and other computer peripherals. By way of example, the computer carrying case 1 encloses a portable workstation including a notebook computer, printer, cellular phone, satellite phone, handset, modem, digital camera, optical scanner, DC battery supply, and battery charger. The precise selection and arrangement of the aforementioned hardware components which are used to form the portable workstation within the carrying case 1 are a matter of choice to be made by those of ordinary skill in the art depending upon the application of the workstation and the needs of the user. Nevertheless, reference may be made to U.S. Pat. No. 5,212,628 for one example of a modular portable computer workstation within a carrying case.

The carrying case 1 of this invention is preferably a rugged, shock resistant, air and water resistant enclosure which has a generally flat, rectangular lid 2 that is pivotally attached to a deep, rectangular body 4 by means of hinges, or the like, so that the lid can be rotated between an opened case position (as shown in FIGS. 1 and 2) and a closed case position relative to the body 4. The lid 2 and the body 4 are releasably secured to one another in the closed case position by means of the usual latches 6 on the body 4 cooperating with complementary catches 8 on the lid 2. The carrying case 1 is also provided with a handle 10 that is attached to and extends outwardly from the front of the body 4 to facilitate transport of the workstation.

Figure 3:
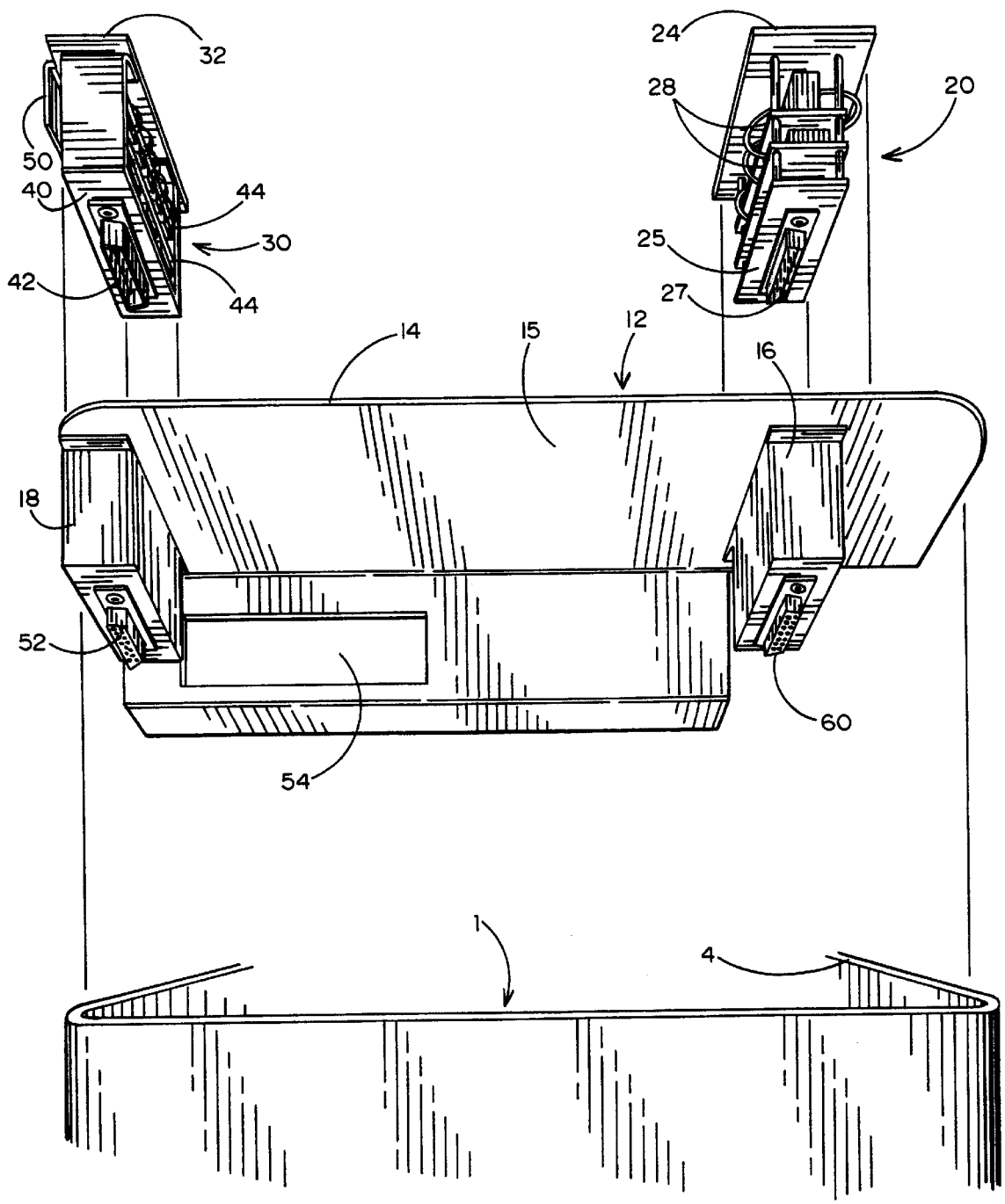
FIG. 3 is an exploded view of the shroud, the plug-in connector module, the plug-in switch module, and the carrying case.

Located at the interior of the body 4 of the carrying case 1 is a shroud 12. As is best shown in FIG. 3 of the drawings, the shroud 12 has a top or cover plate 14. In the assembled relationship shown in FIGS. 1 and 2, the shroud is preferably arranged so as to extend along one side of the body 4. However, it is to be understood that the exact location of the shroud 12 within body 4 is dependent upon the hardware configuration of the computer and computer peripherals to be carried by case 1. Therefore, the position of the shroud 12 within the body 4 of carrying case 1 is not to be regarded as a limitation of this invention.

As is shown in FIGS. 1–3, the cover plate 14 at the top of shroud 12 will be spaced above the bottom of carrying case 1 so as to establish a storage compartment 15 (best shown in FIG. 3) below plate 14. By virtue of the foregoing, and to enable a compact workstation configuration, various electrical components and cables (not shown) may be efficiently located in the compartment 15 below the cover plate 14 so as to be surrounded by the shroud 12 to thereby minimize the consumption of usable space and avoid interfering with the computer and peripherals which lie within the body 4 of case 1. By way of example, one or more of a power distribution panel, power regulators, temperature and voltage sensing boards, battery power supply, and cable harnesses for routing power and control lines between the computer, computer peripherals and battery power supply may be conveniently enclosed by the shroud 12 and disposed at an out-of-the way location in the storage compartment 15 below the cover plate 14 thereof A first pocket 16 (best shown in FIG. 3) is formed through one end of the cover plate 14 at the top of the shroud 12, and a second pocket 18 (also best shown in FIG. 3) is formed through the opposite end of cover plate 14. The first pocket 16 is sized to receive a plug-in switch module 20 having a series of manually operated function switches 22 that will be accessible to the user when the lid 2 of carrying case 1 is in the opened case position.

Figure 4:
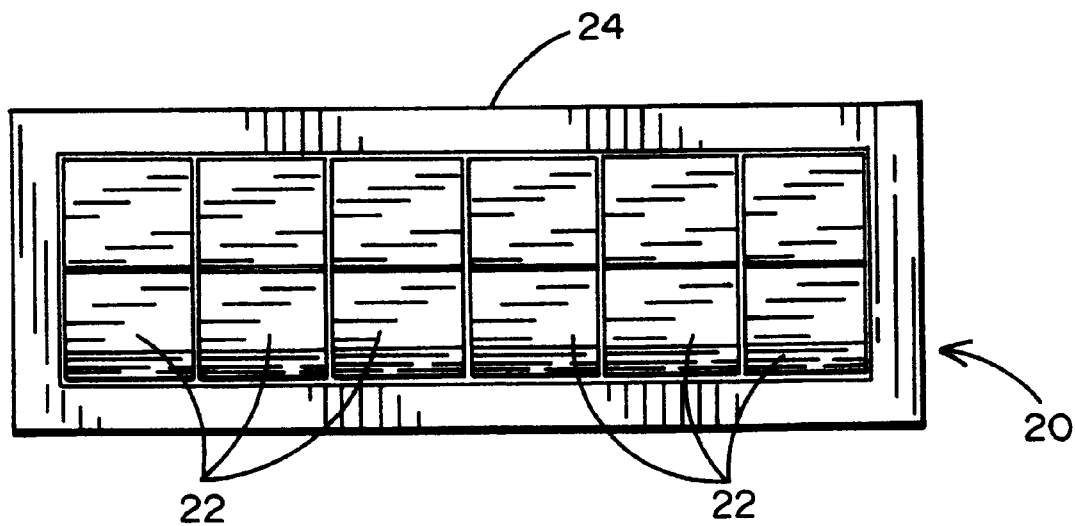
FIG. 4 is a top view of the plug-in switch module of FIG. 2 including a series of manually operated function switches mounted thereon.
Figure 5:
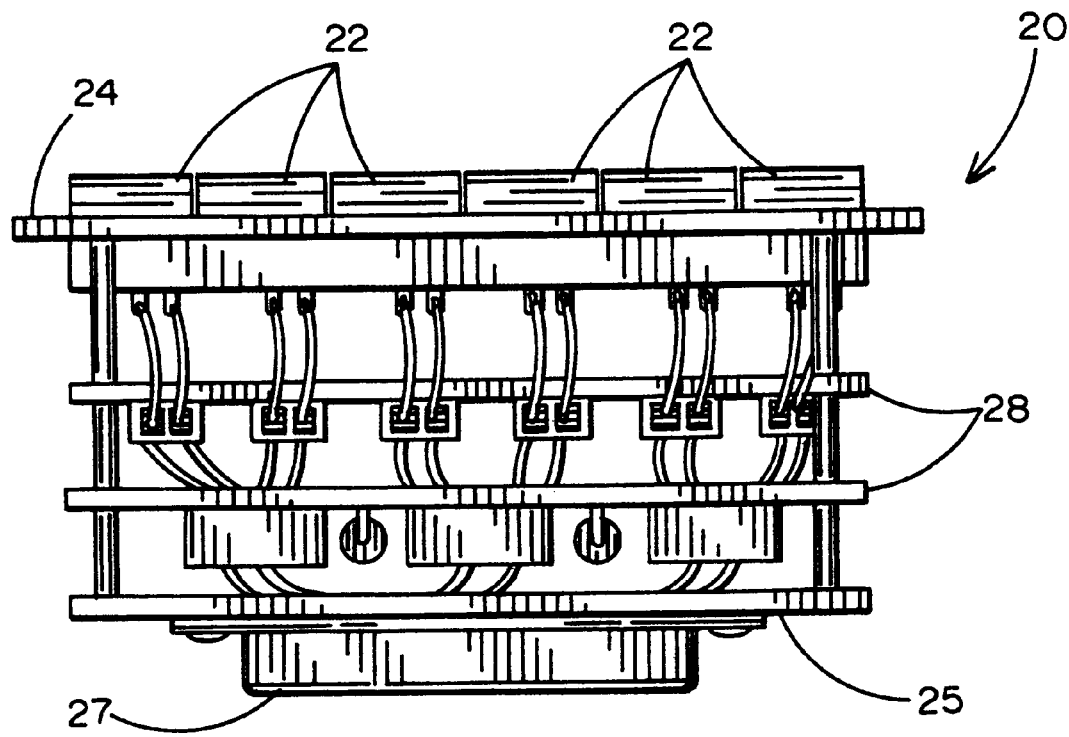
FIG. 5 is a side elevation of the plug-in switch module carrying a set of circuit boards and a multi-pin connector that is electrically connected to the manually operated switches via the circuit boards.

The details of the plug-in switch module 20 are now described or referring concurrently to FIGS. 4 and 5 of the drawings. As is best shown in FIG. 4, the top 24 of the plug-in switch module 20 includes the manually operated function switches 22. As is best shown in FIG. 5, the bottom 25 of plug-in switch module 20 is carried by a bracket that is affixed to the top 24 of switch module 20, whereby the top and bottom 24 and 25 of module 20 are spaced one above the other. Mounted on the bottom 25 of switch module 20 is a commercially available multi-pin connector 27. The switch module bracket also carries a stack of printed circuit boards 28 that are mounted on posts and electrically connected between the switches 22 at the top 24 of plug-in switch module 20 and the multi-pin connector 27 at the bottom 25 of switch module 20. The circuit boards 28 carried by the switch modules 20 have suitable electronic components and logic circuitry that are adapted to control the distribution of power to the printer and other computer peripherals within carrying case 1, as will soon be described. In this regard, the system logic circuitry may be conveniently changed by substituting one circuit board for another to suit the requirements of the user of the portable workstation within carrying case 1.

To enhance the modular nature of the workstation, the plug-in switch module 20 is removably received by the pocket 16 formed through the cover plate of shroud 12. As is best shown in FIG. 3, a complementary female connector 60 is affixed to the shroud 12 at the bottom of the pocket 16 thereof. Accordingly, as the plug-in switch module 20 is received by pocket 16, the multi-pin connector 27 carried at the bottom 25 of switch module 20 will automatically be moved towards and coupled to the complementary connector 60 within pocket 16. Therefore, the manually operable function switches 22 of plug-in switch module 20 will be electrically connected to the connector 60 of pocket 16 via the stack of power distributing circuit boards 28 and the connector 27 at the bottom 25 of switch module 20.

Figure 6:
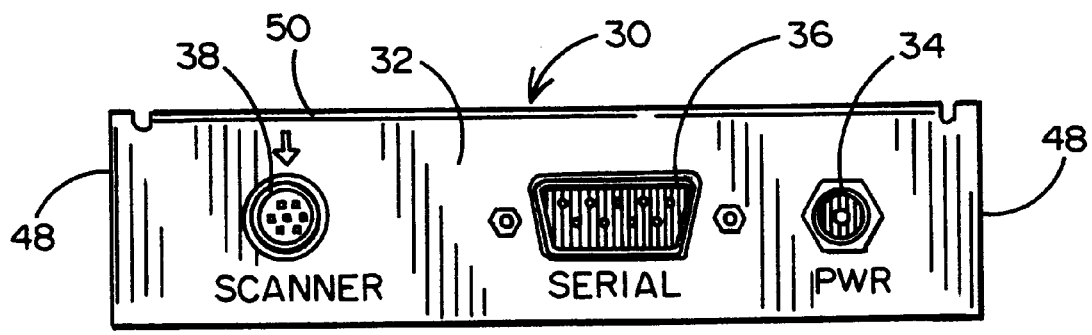
FIG. 6 is a top view of the plug-in connector module of FIG. 2 including a series of connectors mounted thereon.

A plug-in connector module 30 is sized to be received within the pocket 18 through the cover plate 14 of the shroud 12 opposite the plug-in switch module 20. The details of connector module 30 are now described while referring concurrently to FIGS. 6 and 7 of the drawings. As is best shown in FIG. 6, the top 32 of plug-in connector module 30 is provided with a power connector 34 from which power can be supplied to a digital camera (not shown). The top 32 of connector module 30 is also provided with a serial port 36 to be coupled to the digital camera. Likewise, a scanner connector 38 is mounted at the top 32 of connector module 30 to which the cable from a scanner (also not shown) may be connected.

Figure 7:
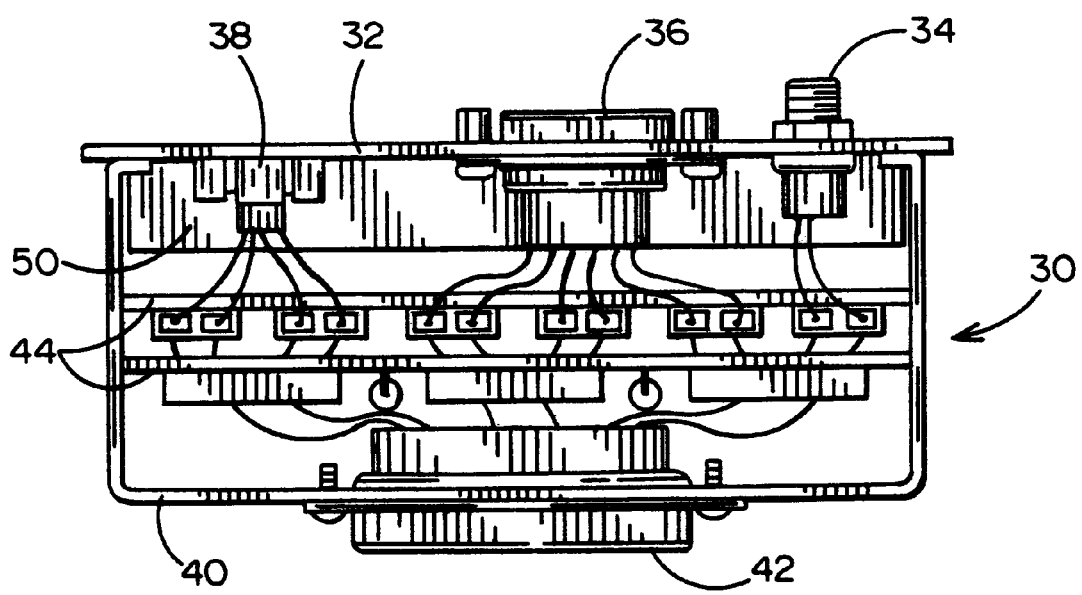
FIG. 7 is a side elevation of the plug-in connector modular having a multi-pin connector mounted at the bottom of the connector module and electrically connected to the connectors at the top of the module.

The connector module 30 shown in FIGS. 6 and 7 includes connectors 34, 36 and 38 for a digital camera and a scanner located within the body 4 of carrying case 1. However, the function, number and type of connectors mounted at the top 32 of connector module 30 may change depending upon the nature of the computer and the computer peripherals which form the portable workstation within carrying case 1.

As is best shown in FIG. 7, the bottom 40 of the plug-in connector module 30 is carried by a bracket that is affixed to the top 32 of connector module 30, whereby the top 32 and bottom 40 of module 30 are spaced one above the other. Like the switch module 20, the bracket of the connector module 30 also carries a stack of printed circuit boards 44 between the top 32 and bottom 40. Circuit boards 44 have logic circuitry so that the computer can be interfaced with different computer peripherals at connectors 34, 36 and 38. Mounted on the bottom 40 of connector module 30 is a commercially available multi-pin connector 42 capable of providing required signal and power interfaces. The multi-pin connector 42 at the bottom 40 of connector module 30 is electrically connected to the connectors 34, 36 and 38 at the top 32 of module 30 by circuit boards 44.

As an important advantage of the present invention in terms of lowering cost and increasing flexibility, the plug-in connector module 30 is removably received by the pocket 18 formed through the cover plate 14 of shroud 12. To accomplish the foregoing, the top 32 of connector module 30 has a lip 50 depending therefrom and running downwardly along a side of module 30. When the plug-in connector module 30 is received by pocket 18, the lip 50 of connector module 30 extends over and around the back edge of shroud 12 so as to lie in frictional engagement therewith. The frictional engagement between the lip 50 of connector module 30 and the shroud 12 retains the connector module 30 within the pocket 18 until an upward pulling force is applied to module 30.

As is best shown in FIG. 3, a complementary female connector 52 is affixed to the shroud 12 at the bottom of the pocket 18 thereof As the plug-in connector module 30 is removably received within the pocket 18 through the cover plate 14 of shroud 12, the multi-pin connector 42 carried at the bottom 40 of the connector module 30 will automatically be moved towards and coupled to the complementary connector 52 within pocket 18.

In the assembled relationship shown in FIG. 1, with the plug-in switch module 20 received within the pocket 16 through the cover plate 14 of shroud 12 and the plug-in connector module 30 received within the pocket 18, each of the connectors 60 and 52 extends inwardly of the storage compartment 15 of shroud 12 below cover plate 14 (best shown in FIG. 3), whereby cables that carry computer interface, power and voltage distribution signals to the computer peripherals of the portable workstation can be attached between the connectors 60 and 52 at an unobtrusive location of the carrying case 1.

More particularly, a cable harness (not shown) can be positioned below the cover plate 14 of shroud 12 to permit cables to be attached from the connector 60 lying below pocket 16 to both of the connector 52 lying below pocket 18 and to the computer printer within the carrying case 1. To facilitate access to the computer printer, a window 54 is formed through a side of the shroud 12 below cover plate 14. A connector module (not shown) that is similar to the connector module 30 described above is received through window 54 so that the printer can be connected to the computer via connector 60.

It may now be appreciated that the plug-in switch module 20 is connected to the printer (not shown) and to the connectors 34, 36 and 38 at the top 32 of the plug-in connector module 30 by means by mating together the complementary connector pairs 27, 60 and 42, 52. Individual function switches 22 of switch module 20 may be selectively operated to permit the workstation of carrying case 1 to be controlled from atop the shroud 12 in a manner that is generally described in U.S. Pat. No. 5,226,540, the details of which are incorporated herein by reference. Nevertheless, and by way of example, operating one or more of the function switches 22 enables the user to distribute power and route computer interface signals to the printer and the other computer peripherals within carrying case 1 or, in the alternative, to connect the computer of the workstation to external peripherals (e.g. communications devices) that are available from outside carrying case 1.

Accordingly, the plug-in switch module 20 and the plug-in connector module 30 described herein may be removed from the carrying case 1 and replaced with new or different modules. In this way, changes to the portable computer workstation can be made to provide power and control to a different number or variety of the computer peripherals within the body 4 of carrying case 1 while avoiding the necessity of having the make time consuming mechanical or electrical changes and preserving the modular nature of the workstation. With the plug-in connector module 30 received by the pocket 18, the top 32 of connector module 30 will conveniently lie above the cover plate 14 of shroud 12 so that the connectors 34, 36 and 38 will be readily available to the user. In this manner, the cable runs between the computer, peripherals and battery power supply are accessible to be quickly and easily disconnected above the shroud 12 without having to first empty the body 4 of carrying case 1 or manipulate the workstation therewithin. Moreover, different peripherals can be removed from the carrying case 1 without disturbing the remaining peripherals. What is still more, carrying cases like that shown in the drawings can be mass produced and, after making simple and relatively low cost changes, easily adapted to the computing needs of different users or different working environments by allowing a wider range of computers and peripherals to be used together in a portable workstation.

Although a preferred embodiment of the invention has been shown and described various modifications and changes can be made without departing from the true spirit and scope thereof For example, although cable runs have been described as extending in FIG. 3 between the connectors 60 and 52 at the bottom of the pockets 16 and 18 of shroud 12, it is to be understood that the connectors 60 and 52 could be changed to permit wireless IR signal coupling therebetween in order to increase the flexibility of signal transfer between the switch and connector modules 20 and 30.

What is claimed is:

1. For a carrying case having a body in which to transport a personal computer, at least one computer peripheral and a source of power, the improvement comprising a connector module removably attached to the body of said carrying case and detachably connected to said at least one computer peripheral, a switch module removably attached to the body of said carrying case and having switch means to be coupled between said source of power and said connector module, said switch means being operated to route power to said at least one computer peripheral by way of said connector module, said connector module including plug-in input means adapted to communicate with the switch means of said switch module and plug-in output means interconnected with said plug-in input means and adapted to be connected to said at least one computer peripheral, and a shroud having a cover that extends across at least some of the body of said carrying case so that a space is established between said cover and said body, said connector module being removably attached to the body of said carrying case at said shroud, such that the plug-in output means of said connector module lies above the cover of said shroud and the plug-in input means of said connector module lies below said cover.

2. The improvement recited in claim 1, further comprising at least one circuit board connected between said plug-in input means and said plug-in output means of said connector module and having logic for routing power and control signals between said at least one computer peripheral and said personal computer by way of the switch means of said switch module.

3. The improvement recited in claim 1, wherein said connector module is located within the body of said carrying case so that said plug-in input means and said plug-in output means thereof are accessible without having to disturb either of said personal computer, said at least one computer peripheral or said source of power.

4. The improvement recited in claim 1, wherein said shroud has a first pocket formed through the cover thereof and extending into the space between said cover and the body of said carrying case, said connector module and said plug-in input means of said connector module being removably received within said first pocket.

5. The improvement recited in claim 4, wherein said shroud also has a first mating connector that communicates with said first pocket and is adapted to be coupled to the switch means of said switch module, said plug-in input means of said connector module plugging into said first mating connector when said connector module is removably received within said first pocket.

6. The improvement recited in claim 4, wherein said connector module has a lip depending therefrom, said lip moving into fictional engagement with said shroud when sad connector module is removably received within the first pocket of said shroud to releasably attach said connector module to said shroud.

7. The improvement recited in claim 4, wherein said shroud also has a second pocket formed through the cover thereof and extending into the space between said cover and the body of said carrying case, said switch module being removably attached to the body of said carrying case by receipt within the second pocket of said shroud.

8. The improvement recited in claim 7, wherein said shroud also has a second mating connector that communicates with said second pocket, and said switch module has plug-in means connected to the switch means thereof, the plug-in means of said switch module plugging into said second mating connector when said switch module is removably received within said second pocket, and the second mating connector of said second pocket adapted to be coupled to the first mating connector of said first pocket to place said switch module and said connector module in communication with one another.

9. The improvement recited in claim 8, wherein said switch module includes at least one circuit board electrically connected between said switch means of said switch module and said plug-in means thereof, said at least one circuit board having control logic for routing power from said source of power to said at least one computer peripheral by way of said connector module when said switch module and said connector module are placed in communication with one another and the switch means of said switch module is operated.

10. For a carrying case having a body in which to transport a personal computer, at least one computer peripheral and a source of power, the improvement comprising:

a shroud located within and extending across at least some of the body of said carrying case and first and second pockets formed through and projecting below said shroud;

a connector module to be detachably connected to said at least one computer peripheral and removably received within the first pocket of said shroud; and a switch module connected to said source of power and removably received within the second pocket of said shroud, said switch module adapted to be coupled to said connector module below said shroud so that power from said source of power is supplied to said at least one computer peripheral via said switch module and said connector module.

* * * * *